(12) United States Patent
Wu et al.

(10) Patent No.: US 12,249,855 B2
(45) Date of Patent: Mar. 11, 2025

(54) BATTERY STRESS RELIEF SYSTEM WITH BYPASS

(71) Applicant: Yazaki North America, Inc., Canton, MI (US)

(72) Inventors: Yuanyuan Wu, Manchester, MI (US); Kenneth John Russel, South Lyon, MI (US)

(73) Assignee: Yazaki North America, Inc., Canton, MI (US)

( * ) Notice: Subject to any disclaimer, the term of this patent is extended or adjusted under 35 U.S.C. 154(b) by 387 days.

(21) Appl. No.: 17/240,217

(22) Filed: Apr. 26, 2021

(65) Prior Publication Data

US 2021/0336452 A1 Oct. 28, 2021

Related U.S. Application Data

(60) Provisional application No. 63/016,087, filed on Apr. 27, 2020.

(51) Int. Cl.
*H02J 7/00* (2006.01)
*B60L 53/00* (2019.01)

(52) U.S. Cl.
CPC ............ *H02J 7/0029* (2013.01); *B60L 53/00* (2019.02); *H02J 7/007* (2013.01); *B60L 2240/36* (2013.01)

(58) Field of Classification Search
CPC ..... B60L 2240/36; B60L 53/00; H02H 9/026; H02J 2310/48; H02J 7/0029; H02J 7/007; H02J 7/345
See application file for complete search history.

(56) References Cited

U.S. PATENT DOCUMENTS

| 5,204,611 A | 4/1993 | Nor et al. |
| 6,252,379 B1 | 6/2001 | Fischl et al. |

(Continued)

FOREIGN PATENT DOCUMENTS

| CN | 1421063 A | 5/2003 |
| CN | 101356707 A | 1/2009 |

(Continued)

OTHER PUBLICATIONS

International Search Report and Written Opinion for International Application No. PCT/US2021/029101, mailed Aug. 17, 2021, 10 pages.

(Continued)

*Primary Examiner* — Julian D Huffman
*Assistant Examiner* — Sadia Kousar
(74) *Attorney, Agent, or Firm* — FOLEY & LARDNER LLP

(57) ABSTRACT

A power system includes a battery charge path and capacitor charge path arranged in parallel. During an inrush event, a current limiting element restricts current flow along the battery charge path to relieve battery stress. During the inrush event, current flow between the battery and load along a bypass path is also prevented by a switch element. Under steady state charging conditions, the resistance of the current limiting element decreases, thus increasing current flow between the battery and load along the battery charge path. During steady state conditions, a switch circuit controls operation of the switch element to also allow current flow between the battery and load along the bypass path. The change in the resistance of the current limiting element and/or actuation of the switch element by the switch circuit are optionally based on changes in temperature, and are passively effectuated without requiring an external control input signal.

15 Claims, 5 Drawing Sheets

(56) References Cited

U.S. PATENT DOCUMENTS

| | | | |
|---|---|---|---|
| 6,356,468 B1 | 3/2002 | Havukainen et al. | |
| 7,786,620 B2 | 8/2010 | Vuk et al. | |
| 8,766,602 B1* | 7/2014 | Kimes | H02J 1/001 |
| | | | 320/160 |
| 9,627,723 B2* | 4/2017 | Wang | G01R 31/382 |
| 10,962,597 B2* | 3/2021 | Imanaka | H02J 7/00304 |
| 2005/0041353 A1* | 2/2005 | Finney | H03K 17/0822 |
| | | | 361/103 |
| 2006/0050541 A1 | 3/2006 | Terdan | |
| 2009/0295334 A1 | 12/2009 | Yang et al. | |
| 2011/0068890 A1 | 3/2011 | Yang et al. | |
| 2012/0063043 A1* | 3/2012 | Divan | H02H 9/001 |
| | | | 361/58 |
| 2013/0154371 A1 | 6/2013 | Ju | |
| 2013/0266826 A1 | 10/2013 | Cowperthwaite et al. | |
| 2014/0181540 A1 | 6/2014 | Hua et al. | |
| 2014/0288753 A1 | 9/2014 | Engdahl | |
| 2016/0126859 A1 | 5/2016 | Wang et al. | |
| 2016/0372801 A1 | 12/2016 | Clemente et al. | |
| 2018/0166892 A1 | 6/2018 | Sepe et al. | |
| 2019/0248252 A1 | 8/2019 | Jin | |
| 2021/0288643 A1 | 9/2021 | Boudoux et al. | |

FOREIGN PATENT DOCUMENTS

| | | |
|---|---|---|
| CN | 205523742 U | 8/2016 |
| CN | 106684961 A | 5/2017 |
| CN | 206893692 U | 1/2018 |
| CN | 110137915 A | 8/2019 |
| JP | 2002-142357 A | 5/2002 |
| JP | 2009-089535 A | 4/2009 |
| JP | 2015-154585 A | 8/2015 |
| KR | 10-2019-0061955 A | 6/2019 |

OTHER PUBLICATIONS

International Search Report and Written Opinion for International Application No. PCT/US2021/029113, mailed Aug. 13, 2021, 11 pages.

\* cited by examiner

BATTERY STRESS RELIEF SYSTEM WITH BYPASS

CROSS-REFERENCE TO RELATED APPLICATION

This application claims priority to, and the benefit of the filing date of U.S. Provisional Patent Application No. 63/016,087, filed Apr. 27, 2020, the entire disclosure of which is incorporated herein by reference in its entirety.

BACKGROUND

Rapid charge and discharge events adversely affect the health of a battery, particularly when they occur during the use of the battery with a high power load. Such inrush events may occur, for example, as a result of sudden demands from a load (such as, e.g., upon initially establishing electrical contact between the battery and a load) or as a result of sudden flow of current to the battery during recharging.

Battery stress may be of particular concern for an electric vehicle (EV), given the high power demands of the main battery and frequent exposure of the battery to inrush events (e.g. acceleration of the EV, regenerative braking, etc.) during the operation. Reduced battery performance and capacity may cause reduced vehicle performance, eventually leading to early and potentially costly battery replacement.

SUMMARY

According to one implementation of the present disclosure, a power system for a vehicle includes a battery charge path and a capacitor charge path arranged in parallel. The battery charge path is configured to provide current from a battery to a load. The capacitor charge path is configured to provide current from a capacitor to the load. A current limiting element having a variable resistance is arranged in series along the battery charge path. The charge system further includes a bypass system. The bypass system includes a bypass path arranged in parallel to the battery charge path. A switch element is arranged along the bypass path. The switch element is configured to selectively prevent current flow and permit current flow along the bypass path. A switch circuit is configured to prevent current flow along the bypass path at the same time the current limiting element is defined by a resistance that substantially restricts current flow between the battery and load.

In some embodiments, current flow between the battery and load is less than current flow along the capacitor charge path when the current limiting element is defined by a resistance that substantially restricts current flow between the battery and load. The switch circuit optionally is configured to allow current flow along the bypass path at the same time the current limiting element is defined by a low resistance that allows current to flow between the battery and load. In some embodiments, there is substantially no current flow along the capacitor charge path between the capacitor and the load when the switch circuit operates to allow current flow along the bypass path.

In various embodiments, the switch circuit includes a temperature-variable component having a resistance that varies responsive to a first change in temperature. The change in resistance is optionally effectuated without the application of an external control input signal to the temperature-variable component. In some embodiments, the current limiting element comprises a thermally sensitive element having a resistance that varies responsive to a second change in temperature. The first change in temperature may be the same as the second change in temperature. Alternatively, the first change in temperature may be different than the second change in temperature.

The temperature-variable component optionally includes a positive temperature coefficient thermistor, and the thermally sensitive element optionally includes a negative temperature coefficient thermistor. A resistance of the temperature-variable component increases responsive to a core of the temperature-variable component reaching a predetermined temperature. A resistance of the thermally sensitive element decreases responsive to a core of the thermally sensitive element reaching the predetermined temperature.

According to various embodiments, the switch element includes a semiconductor switch. A change in the resistance of the temperature-variable component is optionally configured to vary a voltage signal applied to a gate of the semiconductor switch. The current limiting element optionally may include a thermally sensitive element. A resistance of the thermally sensitive element may decrease responsive to a core of the thermally sensitive element reaching a temperature that exceeds a first threshold temperature range.

A voltage signal applied to the gate of the semiconductor switch optionally operates to allow current flow through the bypass path responsive to a core of the temperature-variable component reaching a temperature that exceeds a second threshold temperature range. The second threshold temperature range corresponds to temperatures that are greater than the temperatures of the first threshold temperature range. A resistance of the temperature-variable component optionally increases responsive to a temperature of the core of the temperature-variable component exceeding the second threshold temperature range.

In some embodiments, the switch circuit further includes a power source and a resistor that is arranged in series with the temperature-variable component. The temperature-variable component is optionally directly physically coupled to the battery charge path.

According to another implementation of the present disclosure, a power pack assembly includes a housing and a power system supported by the housing. The housing includes a first portion configured to store a battery, and a second portion configured to store a capacitor. The power system includes a battery charge path, a capacitor charge path, a current limiting element, and a bypass system. The battery charge path extends between the first portion of the housing and a terminal supported by the housing. The capacitor charge path is arranged in parallel to the battery charge path and extends between the second portion of the housing and the terminal.

The current limiting element has a variable resistance, and is arranged in series along the battery charge path. The bypass system includes a bypass path, a switch element, and a switch circuit. The bypass path is arranged in parallel to the battery charge path. The switch element is arranged along the bypass path. The switch element is configured to selectively restrict current flow and penult current flow along the bypass path. The switch circuit is configured to operate the switch element to restrict current flow along the bypass path.

The power pack assembly also optionally includes a battery and a capacitor. The battery is contained within the first portion of the housing, and is connected to the terminal by the battery charge path. The capacitor is contained within the second portion of the housing, and is connected to the terminal by the capacitor charge path. The switch circuit optionally includes a temperature-variable component having a variable resistance. The switch circuit is configured to operate the switch element to selectively restrict current flow and permit current flow along the bypass path responsive to a change in a temperature of the core of the temperature-variable component.

According to another implementation of the present disclosure, a method for charging a load includes causing current from a battery to flow through a current limiting element located along a battery charge path that couples the battery to a load. Current is caused to flow from a capacitor to the load. The capacitor is located in parallel to the current limiting element. A switch circuit is operated to cause a switch element to allow current to flow between the battery and the load along a bypass path that is arranged in parallel to the battery charge path. The switch circuit operates the switch element to allow current flow between the battery and the load along the bypass path at the same time that current from the battery is caused to flow to the battery along the battery charge path.

The current limiting element optionally includes a thermally sensitive element and the switch circuit optionally includes a temperature-variable component. The switch circuit operates the switch element based on a change in a resistance of the temperature-variable component. The change in the resistance of the temperature-variable component occurs responsive to a temperature of the core of the temperature-variable component reaching a first temperature. The thermally sensitive element causes current to flow along the battery charge path based on a decrease in a resistance of the thermally sensitive element. The change in the resistance of the thermally sensitive element occurs responsive to a core temperature of the thermally sensitive element reaching a second temperature. The core of the temperature-variable component reaches the first temperature after current flow from the capacitor to the load has ceased. The core of the thermally sensitive element reaches the second temperature before current flow from the capacitor to the load has ceased.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DESCRIPTION

Referring generally to the FIGURES, a power system 10 comprising a charge system 100 and a bypass system 400 is shown and described according to various embodiments. In general, the charge system 100 relieves battery stress during an inrush event (e.g., upon establishing an initial electrical coupling between a battery and a load). During steady state operation, the bypass system 400 increases the efficiency of the power system 10 by providing an unrestricted current flow path via which current can be supplied between a battery and a load.

Figure 1:
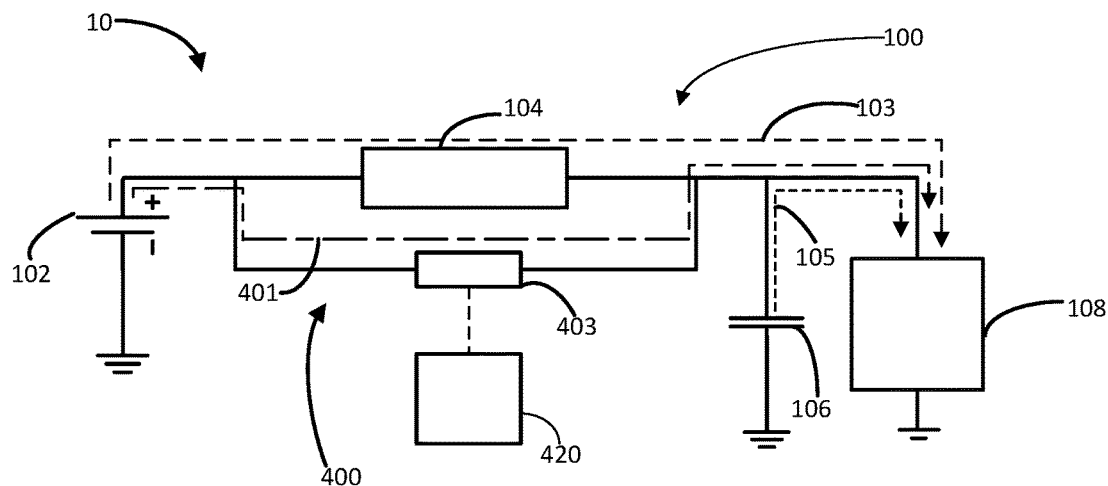
FIG. 1 is a diagram of a power system, according to one embodiment.

As shown in the embodiment of FIG. 1, the charge system 100 includes a battery 102 and a capacitor 106 arranged in parallel. A battery charge path 103 connects the battery to a load 108, and a capacitor charge path 105 connects the capacitor 106 to the load 108, as well as to the battery 102.

The internal resistance of capacitors is typically relatively low, which allows capacitors to respond quickly to inrush events. Thus, the arrangement of the capacitor 106 and battery 102 of the charge system 100 in series allows the capacitor 106 to provide current during an inrush event (e.g., upon initially establishing electrical contact between the charge system 100 and the load 108), allowing the battery 102 to gradually increase current as the load 108 reaches a steady state level of charging. Once a steady state level of charging has been reached, the battery 102 takes over as the primary source of current to the load 108.

The rate at which current flow to the load 108 is provided by the battery 102 and capacitor 106, individually, depends on the difference between the effective resistance of the battery charge path 103 and the effective resistance of the capacitor 106. In a circuit consisting of only a capacitor and battery, the effective resistance of the battery charge path will correspond to the internal resistance of the battery, and the effective resistance of the capacitor will correspond to the internal resistance of the capacitor. Thus, if the difference between an internal resistance of the battery and an internal resistance of the capacitor is small, the battery may still provide a signification portion (e.g., approximately half) of the current to the load during an inrush event. Depending on the power needs of the load, this reduction to current flow from the battery during the inrush event may be insufficient to protect it from damage.

In contrast to a battery, a capacitor incurs minimal wear and degradation when subject to inrush currents. Accordingly, as shown in FIG. 1, the charge system 100 additionally includes a current limiting element 104 that increases the effective resistance of the battery charge path 103 relative to the effective resistance of the capacitor 106. As described with reference to FIG. 3 below, the current limiting element 104 thus increases the rate and amount with which the capacitor 106 is used to meet the current demands of the load 108—and thereby limits the rate and amount of current drawn from the battery 102—during an inrush event. By extending the time during which the capacitor 106 is utilized as the primary source of current to the load 108 during an inrush event, the current limiting element 104 advantageously allows the battery 102 to gradually increase its supply of current to the load 108 in a manner that does not jeopardize its health. Once a steady state level of charging has been reached, the battery 102 is able to safely take over as the primary source of current to the load 108.

The current limiting element 104 may be defined by a variety of different resistive elements. For example, according to some embodiments, the current limiting element 104 comprises a resistor (e.g., a thick film, a thin film, a wirewound arrangement, carbon composite, etc.) having a fixed resistance value. As a resistor does not require any additional components or external control input signals for its operation, a resistor allows the current limiting 104 device to be easily and cost-effectively incorporated into the charge system 100.

Although the resistance provided by a current limiting element 104 comprising a resistor is advantageous during inrush events, the continued restriction to current flow between the battery 102 and load 108 is often undesirable during steady state charging conditions. Accordingly, in other embodiments, the current limiting element 104 alternatively comprises an active element having a resistance that is variable responsive to an external control input signal (received via, e.g., controller, manual adjustment, etc.). Examples of such active elements include rheostats, potentiometers, digital resistors, a field effect transistor operating in a linear mode, etc.

By allowing the effective resistance of the battery charge path 103 to be decreased following an inrush event, a current limiting element 104 comprising an active element advantageously increases the efficiency and speed with which the battery 102 may supply current to the load 108 under steady state charging conditions. However, the increased number of components, complexity, and costs associated with incorporating the external input source required for the operation of an active element may limit the suitability of the use of an active element as a current limiting element 104 in various situations.

Figure 2:
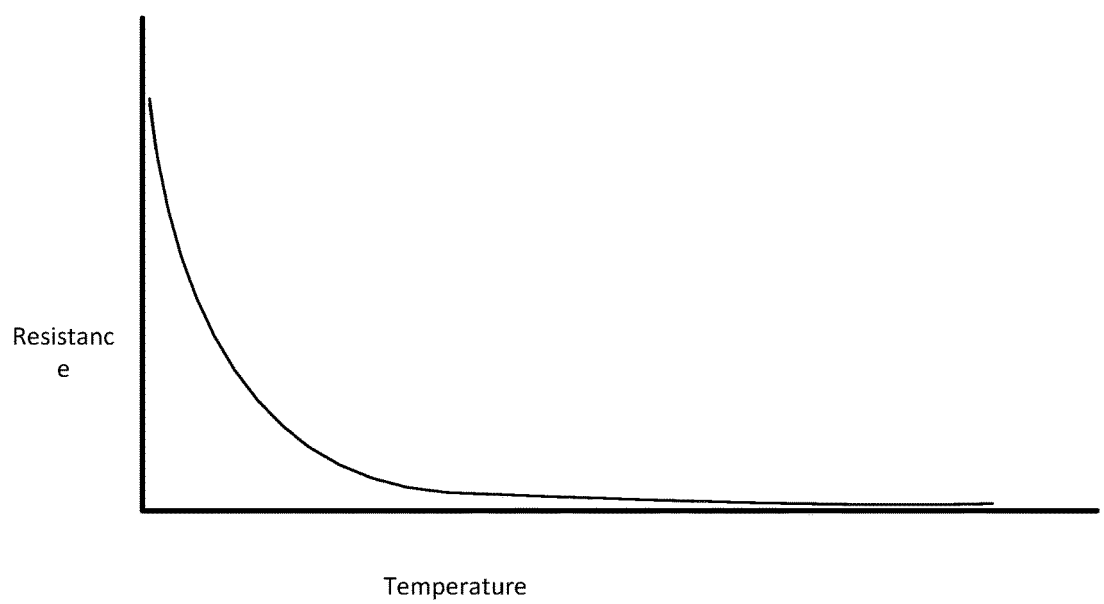
FIG. 2 is an example graph illustrating the resistance value of a thermally sensitive element with respect to temperature, according to one embodiment.

According to various embodiments, the current limiting element 104 advantageously comprises a thermally sensitive element (e.g., a negative temperature coefficient thermistor) that varies in a predictable manner responsive to changes in temperature. As representatively depicted by the graph of FIG. 2, a current limiting element 104 comprising a thermally sensitive element has a large resistance at an initial, low temperature. Upon a core temperature of the thermally sensitive element increasing to a threshold temperature range, the resistance value of the thermally sensitive element decreases non-linearly (e.g., exponentially). Once the core temperature has exceeded the threshold temperature range, the thermally sensitive element operates in a steady state flow state in which the thermally sensitive element provides only a minimal (e.g., no) resistance to current flow to the load 108 from the battery 102.

The increase in the core temperature of the current limiting element 104 comprising a thermally sensitive element may occur as a result of heat that is dissipated through the thermally sensitive element during current flow. The increase in core temperature of the thermally sensitive element may also occur as a result of changes in ambient temperature. For example, the core temperature of the thermally sensitive element may increase as a result of the heat generated by the load 108 or other components of the charge system 100 during operation. According to some embodiments, the thermally sensitive element is optionally connected to the load 108 via a heat sink, so as to increase the responsiveness of the thermally sensitive element to changes in ambient temperature.

The initial resistance of the thermally sensitive element and the threshold temperature range at which the thermally sensitive element reaches the steady state flow state vary based on the construction of the thermally sensitive element. Accordingly, by selecting a thermally sensitive element suited to the operating parameters and conditions of the load 108 with which the charge system 100 is used, a current limiting element 104 comprising a thermally sensitive element is able to provide the benefits of both a fixed resistance resistor and an active element—while avoiding the limitations of each of these options.

Namely, similar to a current limiting element 104 comprising an active element, a current limiting element 104 comprising a thermally sensitive element is able to provide varying degrees of resistance to current flow, thus allowing the effective resistance of the battery charge path 103 to be decreased following an inrush event. However, in contrast to an active element, the thermally sensitive element does not require the receipt of an external control input signal, but rather varies its resistance passively responsive to changes in temperature. Similar to a current limiting element 104 comprising a resistor, this lack of any need for additional components or external control components thus allows a current limiting element 104 comprising a thermally sensitive element to be easily and cost-effectively incorporated into the charge system 100.

Figure 3:
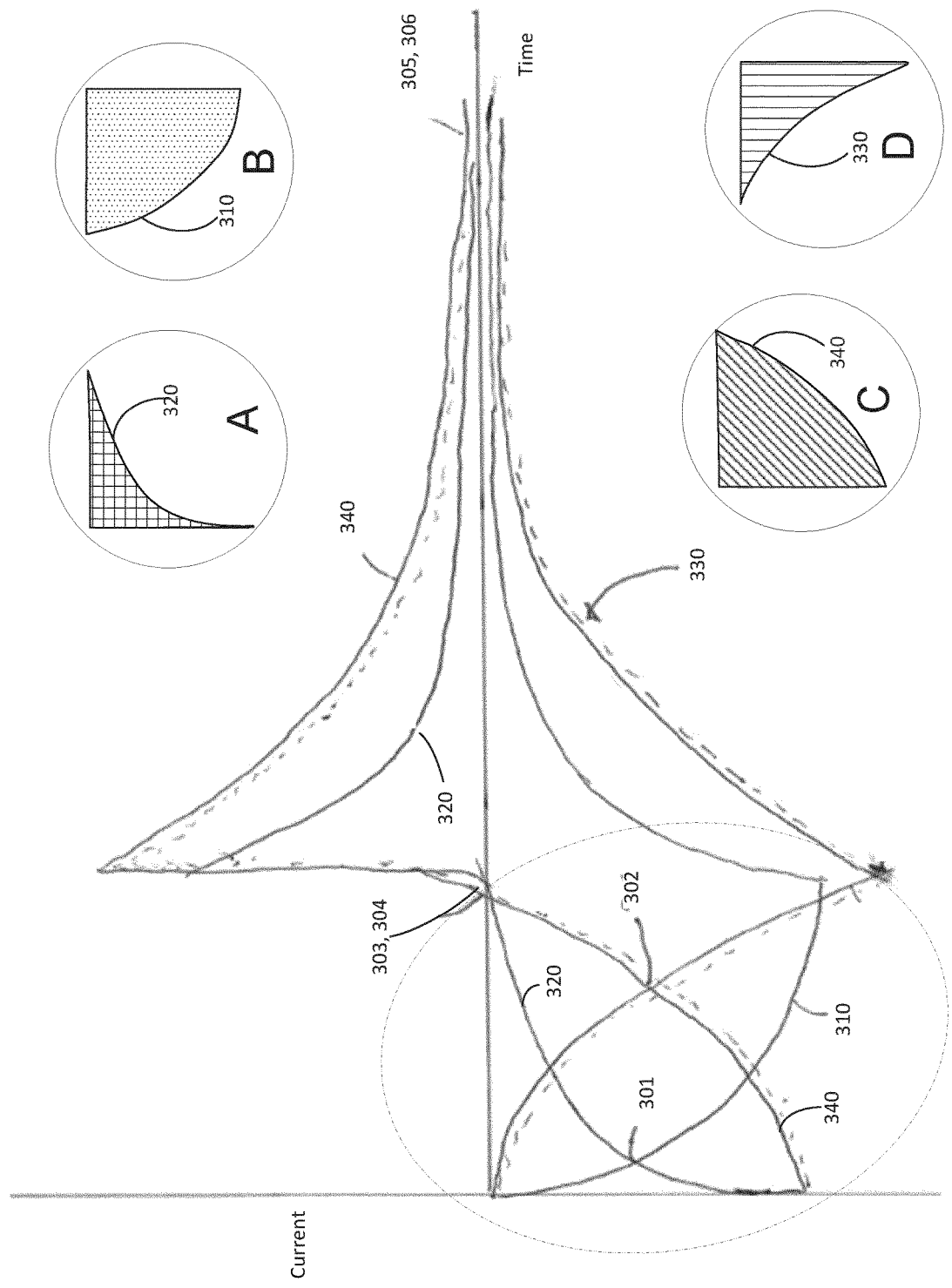
FIG. 3 is an example graph comparing current flow form the components of a charging system and a charge system, according to one embodiment.

Shown in FIG. 3 is a graph illustrating the flow of current from a battery and a capacitor of a charging system which does not include a current limiting element 104, and a charge system 100 that includes a current limiting element 104 comprising a thermally sensitive element during an inrush event. The first curve 310 illustrates a time response curve of the current flow from the battery of the charging system. The second curve 320 illustrates a time response curve of current flow to and from the capacitor of the charging system. The third curve 330 illustrates a time response curve of current flow from the battery 102 of the charge system 100. The fourth curve 340 illustrates a time response curve of the current flow to and from the capacitor 106 of the charge system 100.

As illustrated by the graph of FIG. 3, in both the charging system (which does not include a current limiting element 104) and the charge system 100 (which comprises a current limiting element 104 including a thermally sensitive element), the capacitor is the primary source of current at the initiation of an inrush event. As the capacitor becomes increasingly depleted and the battery increases its discharge of current, an equilibrium point 301, 302 is reached. The equilibrium point 301, 302 corresponds to the time at which time the amount of current supplied by the capacitor is equal to the current supplied by the battery. Following the occurrence of the equilibrium point 301, 302, the amount of current supplied by the battery begins to exceed the current provided by the capacitor. The capacitor continues to supply current to the load until it reaches a transition point 303, 304. Following the occurrence of the transition point 303, 304, the capacitor stops supplying current to the load, and instead begins receiving current from the battery (evidenced by the positive current value of current flow for the capacitor). The battery continues supplying current to the battery and capacitor until a recharge point 305, 306 is reached, which corresponds to a time at which the capacitor has been recharged by the battery After the recharge point 305, 306 the current discharged by the battery attains a steady state of flow to the load.

As shown by the graph of FIG. 3, the charging system (which does not include a current limiting element 104) and the charge system 100 (which comprises a current limiting element 104 including a thermally sensitive element) each achieve a respective transition point 303, 304 and recharge point 305, 306 at similar time. Accordingly, as the incorporation of the current limiting element 104 in the charge system 100 does not adversely affect the time required to recharge the capacitor 106 by the battery 102 following an inrush event.

However, as shown by a comparison of the first curve 310 against the third curve 330, in the absence of a current limiting element 104 to increase an effective resistance of flow between the battery 102 and load 108, the rate of current from the battery of the charging system—which does not include a current limiting element 104—is significantly greater than the rate of current flow from the battery 102 of the charge system 100. Thus, as illustrated by the comparison of the second curve 320 against the fourth curve 340, the amount of current supplied by the capacitor of the charging system is much lower than the amount of current supplied by the capacitor 106 of the charge system 100. As a result in these changes in the rates at which current is supplied between the capacitor and battery components of the charging system and charge system 100, the charging system reaches its equilibrium point 301 much sooner than the charge system 100 reaches its equilibrium point 302.

Thus, as illustrated by the call-outs of FIG. 3, when comparing the amount of energy supplied individually by the capacitor and battery of each of the charging system and charge system 100—which is represented by the area underneath each curve between the start of the inrush event and the occurrence of the transition point 303, 304—the amount of energy supplied by the capacitor of the charging system (see call-out A) is substantially less than the energy supplied by the battery of the charging system (see call-out B). In contrast, the amount of energy supplied by the capacitor 106 of the charge system 100 (see call-out C) is substantially greater than the energy supplied by the battery 102 of the charge system 100 (see call-out D). Accordingly, as illustrated by a comparison of the call-out B of the first curve 310 against the call-out D of the third curve 330, the energy demands on the battery 102 of the charge system 100 (which includes a current limiting element 104) are significantly less than those on the battery of the charging system which does not include a current limiting element 104.

As described above, in embodiments in which the current limiting element 104 comprises a fixed resistor, current is limited both during an inrush event, as well as during subsequent steady state charging. Although charge system 100 embodiments comprising a current limiting element 104 that includes an active element or thermally sensitive element advantageously allow the effective resistance of the battery charge path 103 to be decreased following an inrush event, such current limiting element 104 embodiments may nevertheless still provide some residual resistance to current flow during steady state charging. As a result, the current limiting element 104 may result in the dissipation of heat as current from the battery 102 flows to the load 108, thus decreasing the efficiency of the charge system 100.

Accordingly, as representatively illustrated in FIG. 1, according to various embodiments, the power system 10 also includes a bypass system 400 that allows current to flow unrestricted from the battery 102 to the load 108 following an inrush event. As shown in FIG. 1, the bypass system 400 includes a bypass path 401 having a switch element 403 arranged in parallel to the battery charge path 103. The switch element 403 is selectively controllable to allow unrestricted current flow from the battery 102 to the load 108 during steady state charging conditions. Meanwhile, during an inrush event, the switch element 403 restricts current flow through the bypass path 401, so as to allow the charge system 100 to minimize stress on the battery 102 in the manner described above.

A switch circuit 420 of the bypass system 400 is operably connected to the switch element 403 to effectuate the transition of the switch element 403 between a flow state (in which current is shunted via the bypass path 401 from the battery 102 to the load 108) and a no flow state (in which current flow through the bypass path 401 is restricted, e.g., prevented) based on the operating state (i.e. steady state level, inrush event, etc.) of the charge system 100.

The switch element 403 may be defined by a variety of different constructions, components, and features. For example, the switch element 403 may be controllable via a voltage-based signal, a current-based signal, etc. The switch element 403 may be normally-open or normally-closed. As described with reference to the example bypass system 400 of FIG. 4, the switch element 403 optionally includes a semiconductor switch 405. According to other embodiments, the switch element 403 optionally comprises a relay switch. In yet other embodiments, the switch element 403 may be defined by a variety of other structures.

The switch circuit 420 may utilize a number of various components, structures, and arrangements to operably control the switch element 403 to effectuate the flow or no flow state of the bypass path 401. For example, the switch circuit 420 may comprise a controller that transmits a control input signal to the switch element 403 based on one or more measured or sensed parameters (e.g., a detected level of current, voltage, temperature, status of the capacitor 106, etc.).

During the operation of the charge system 100 to charge a load 108, heat is increasingly generated as current flows through the charge system 100 and to the load 108. As described above, according to various embodiments, the current limiting element 104 advantageously includes a thermally sensitive element that utilizes the increasing heat generated during the powering of a load 108 to passively (i.e., without the need for an external control input signal) change the resistance of the battery charge path 103 in a desired manner during the course of the operation of the charge system 100.

In a similar manner, the switch circuit 420 optionally also utilizes the rise in temperature that occurs during the charging of the load 108 to control the operation of the switch element 403 using a temperature-variable component 421. Thus, just as a current limiting element 104 comprising a thermally sensitive element obviates the need for a complex and costly arrangement via which to effectuate its change in resistance, the use of a temperature-variable component 421 also provides the switch circuit 420 with a simple, cost-efficient option via which a desired control of the switch element 403 may be achieved.

The manner via which the change in resistance of the temperature-variable component 421 causes the switch circuit 420 to effectuate a transition of the switch element 403 between a flow state and a no flow state may be accomplished using a variety of different components and arrangements. In general, the operation of the switch circuit 420 will be based on the temperature-variable component 421 attaining a resistance that falls within a predetermined effective resistance range. Upon attaining a resistance that falls within the effective resistance range, the selection and arrangement of the other components of the switch circuit 420 are configured to allow the switch circuit 420 effectuate the desired transition of the switch element 403. In such a manner, the temperature-variable component 421 is able to operate the switch element 403 without the need for external control input signals.

As described above, current flow through the bypass path 401 is desirably prevented during the inrush event, so as to minimize the rate and amount of energy provided to the load 108 by the battery 102 during the inrush event. Accordingly, in various embodiments, the construction of the temperature-variable component 421 is selected such that a threshold temperature range at which the temperature-variable component 421 attains a resistance that falls within the effective resistance range corresponds to a temperature range having a lowermost temperature that is equal to, or greater than, an expected temperature of the charge system 100, load 108 and/or ambient environment during steady state charging conditions.

To increase the responsiveness of the temperature-variable component 421 to changes in temperature resulting from operation of the charge system 100, the temperature-variable component 421 is optionally positioned in close proximity to the battery 102, the current limiting element 104, and/or to the load 108. Additionally, or alternatively, temperature-variable component 421 is optionally connected to the charge system 100 and/or load 108 via a heatsink or other heat transfer device. For example, the temperature-variable component 421 is optionally physically connected to a portion of the battery charge path 103 extending between the current limiting element 104 and load 108, to increase the ability of the temperature-variable component 421 to respond to changes in temperature occurring as heat is dissipated by the current limiting element 104.

In various embodiments, the temperature-variable component 421 comprises a positive temperature variable element (e.g., a positor, or a positive temperature coefficient resistor) that is defined by a low resistance at low temperatures, and by a high resistance once the temperature of its core exceeds a threshold temperature range. In embodiments in which the current limiting element 104 of the charge system 100 with which the bypass system 400 is used comprises a thermally sensitive element, the construction of the positive temperature variable element defining the temperature-variable component 421 is optionally selected such that the positive temperature variable element attains a resistance that falls within the effective resistance range at a threshold temperature range that is greater than a threshold temperature range at which the resistance of the thermally sensitive element defining the current limiting element 104 undergoes a transition in its resistance. Such a configuration of the temperature-variable component 421 comprising a positive temperature variable element may prevent operation of the switch element 403 to effectuate a flow state through the bypass path 401 during an inrush event.

According to other embodiments, the temperature-variable component 421 alternatively comprises a negative temperature variable element. The negative temperature variable element functions in a manner similar to the thermally sensitive element described with reference to the current limiting element 104 of the charge system 100, in that the resistance of the negative temperature variable element decreases upon exceeding a threshold temperature range. In embodiments in which the current limiting element 104 of the charge system 100 includes a thermally sensitive element, the thermally sensitive element defining the current limiting element 104 and the negative temperature variable element defining the temperature-variable component 421 may be defined by the same, or similar, constructions. Optionally, in some such embodiments, the negative temperature variable element defining the temperature-variable component 421 is constructed such that it attains a resistance that falls within the effective resistance range at threshold temperature range that is higher than a threshold temperature range at which the resistance of thermally sensitive element defining the current limiting element 104 decreases, so as to avoid a premature actuation of the switch element 403 to allow current to flow through the bypass path 401.

The selection and arrangement of the additional components that define the switch circuit 420 is dependent on the features of the switch element 403 (e.g., a construction of the switch element 403, a bias of the switch element 403, etc.) and the type of temperature-variable component 421 (e.g., negative temperature variable element or positive temperature variable element) that are used in the bypass system 400. The flow of current through the switch circuit 420 is supplied from the battery 102, or from a power source comprising a secondary source 430 that is separate from the battery 102. The secondary source 430 may comprise a variety of different sources, such as, e.g., a DC source, such as a DC-DC converter, an accessory battery of a vehicle, etc. Alternatively, current may be supplied to the switch circuit 420 from the battery 102.

In general, the additional components of the switch circuit 420 are selected and arranged such that—upon the temperature-variable component 421 attaining a resistance that falls within the effective temperature range—current flow through the temperature-variable component 421 and/or the resistance of the temperature-variable component 421 cause the switch circuit 420 to provide the switch element 403 with a signal that effectuates a transition of the switch element 403.

For example, in bypass system 400 embodiments in which the switch element 403 is controlled by the switch circuit 420 via a voltage-based signal (such as, e.g., bypass system 400 embodiment of FIG. 4), the switch circuit 420 optionally comprises a resistor 410 and/or other elements that are arranged into a voltage divider configuration. The voltage divider configuration varies the voltage supplied to a gate 407 of a semiconductor switch 405 responsive to changes in the temperature of the core of the temperature-variable component 421 (and thereby the resistance of the temperature-variable component 421). Thus, upon the temperature-variable component 421 attaining a resistance that falls within the effective resistance range, the voltage signal supplied to the gate 407 by the switch circuit 420 corresponds to a voltage sufficient to effectuate a transition of the semiconductor switch 405.

Figure 4:
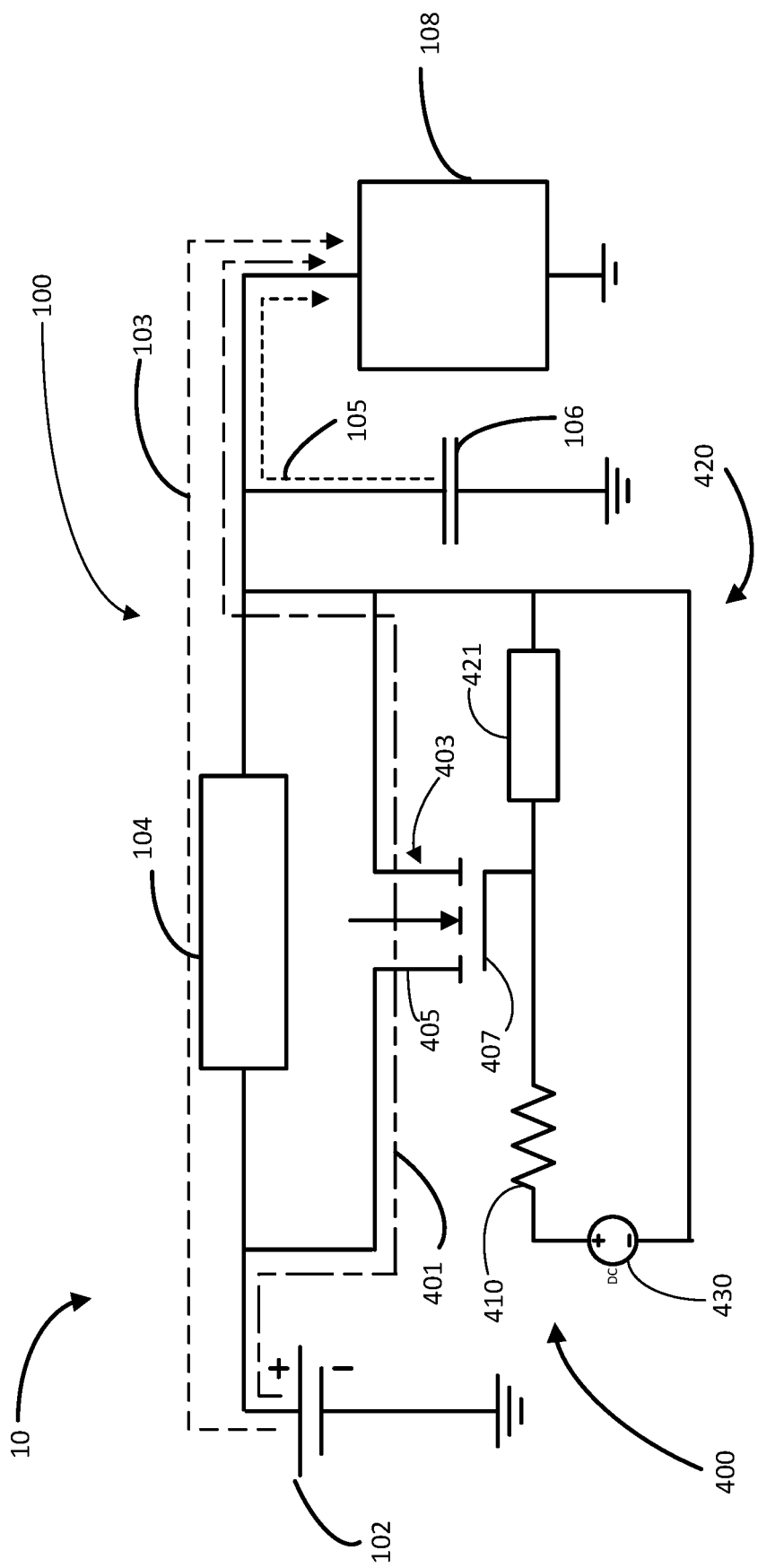
FIG. 4 is a circuit diagram of a power system, according to one embodiment.

Referring to FIG. 4, a bypass system 400 is shown according to one example embodiment. As illustrated in FIG. 4, the switch element 403 comprises a solid state semiconductor switch 405 that restricts or permits current flow based on a voltage applied to a gate 407 of the semiconductor switch 405 by the switch circuit 420. Non-limiting examples of a semiconductor switch 405 include, for example: a field effect transistor (FET), such as a junction field effect transistor (JFET), a metal oxide semiconductor field effect transistor (MOSFET), or other similar type of FET that can operate as a switch based on an applied voltage.

As illustrated by the embodiment of FIG. 4, the switch circuit 420 embodiment shown in the bypass system 400 embodiment of FIG. 4 uses a voltage divider arrangement of a temperature-variable component 421 comprising a negative temperature variable element in series with a fixed resistance resistor 410 to vary a voltage supplied to the semiconductor switch 405. Thus, upon a resistance of the temperature-variable component 421 reaching a level within the effective resistive range (e.g., in response to heat being dissipated as larger current is pulled through the current limiting element 104 during steady state charging), the voltage supplied by the switch circuit 420 to the switch element 403 will correspond to a voltage falling within a threshold voltage range configured to effectuate the transition of the switch element 403—and thus enabling current from the battery 102 to flow through the bypass path 401 to the load 108.

Figure 5:
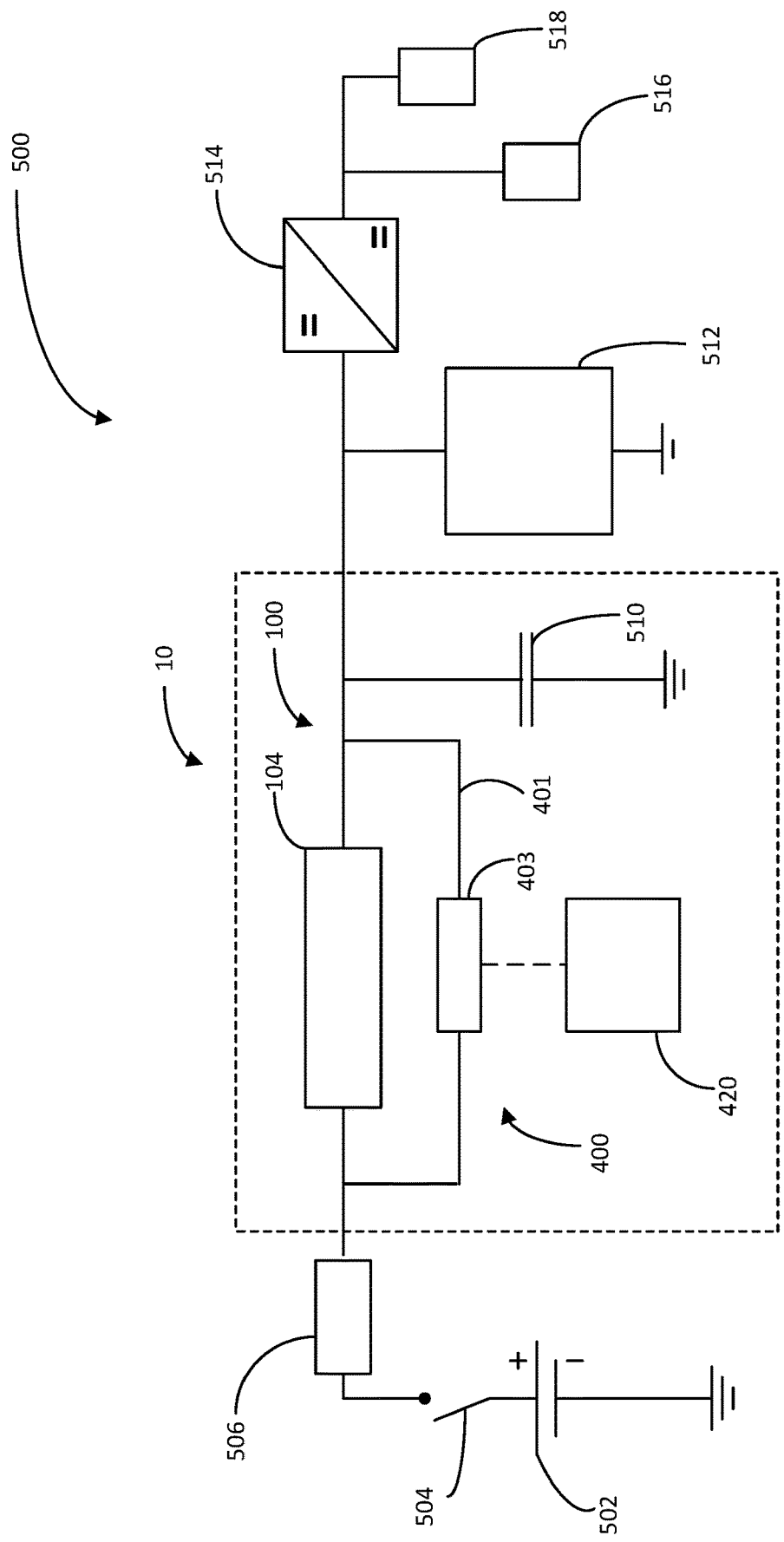
FIG. 5 is a circuit diagram of a high power vehicle system utilizing a power system, according to one embodiment.

Given the high power demands of an electric vehicle ("EV"), according to various embodiments, the power system 10 is advantageously incorporated into an EV power distribution system. Referring to FIG. 5, a high voltage power circuit 500 utilizing a power system 10 as described according to any embodiment above to supply current to one or more high voltage loads 512 (e.g., 48V loads) such as, e.g., an electromechanical anti-role control (FARC), an electrified turbo (E-Turbo), a belt starter-generator (BSG), etc. of an EV is shown, according to one example embodiment.

A contactor 504 and/or a current sensor 506 are optionally arranged in series with the primary battery 502 of the EV. The contactor 504 may comprise any electronic or electromechanical device that disconnects battery 502 from the remainder of circuit 500. For example, contactor 504 is a relay, contactor, or other switch that is manually or automatically configurable to allow or prevent current flow from/to battery 501. The contactor 504 is optionally controlled by a control circuit (not shown) to provide thermal protection, over-voltage protection, under-voltage protection, or other protections to circuit 500. The contactor 504 may optionally be replaced (or supplemented) with a fuse or other protection device.

The optional current sensor 506 measures current flow from/to the battery 502. Current sensor 506 may monitor charge and discharge rates, and other parameters that may affect the health or condition of the battery 502. In some embodiments, current sensor 506 may also be connected to the optional control circuit used to operate the contactor 504 based on measured current flow from, and to, battery 502.

An optional DC-DC converter 514 steps-down the power provided by battery 502 and/or supercapacitor 510. The stepped down power may be used for lower-demand components 516 of the EV, such as e.g., head lights, power windows, a radio, or other components of the EV and/or to recharge a lower power battery 518 (e.g., a 12V battery).

A power system 10 comprising a charge system 100 and a bypass system 400 described according to any embodiment herein may be electrically connected to the battery 502 and supercapacitor 510 of the high voltage power circuit 500, according to any number of different arrangements, configurations, etc. The power system 10 is optionally integrated into other components of the EV. For example, in some embodiments the power system 10 is integrated into the high voltage power circuit 500 via a power pack system 600 such as representatively shown in FIG. 6.

Figure 6:
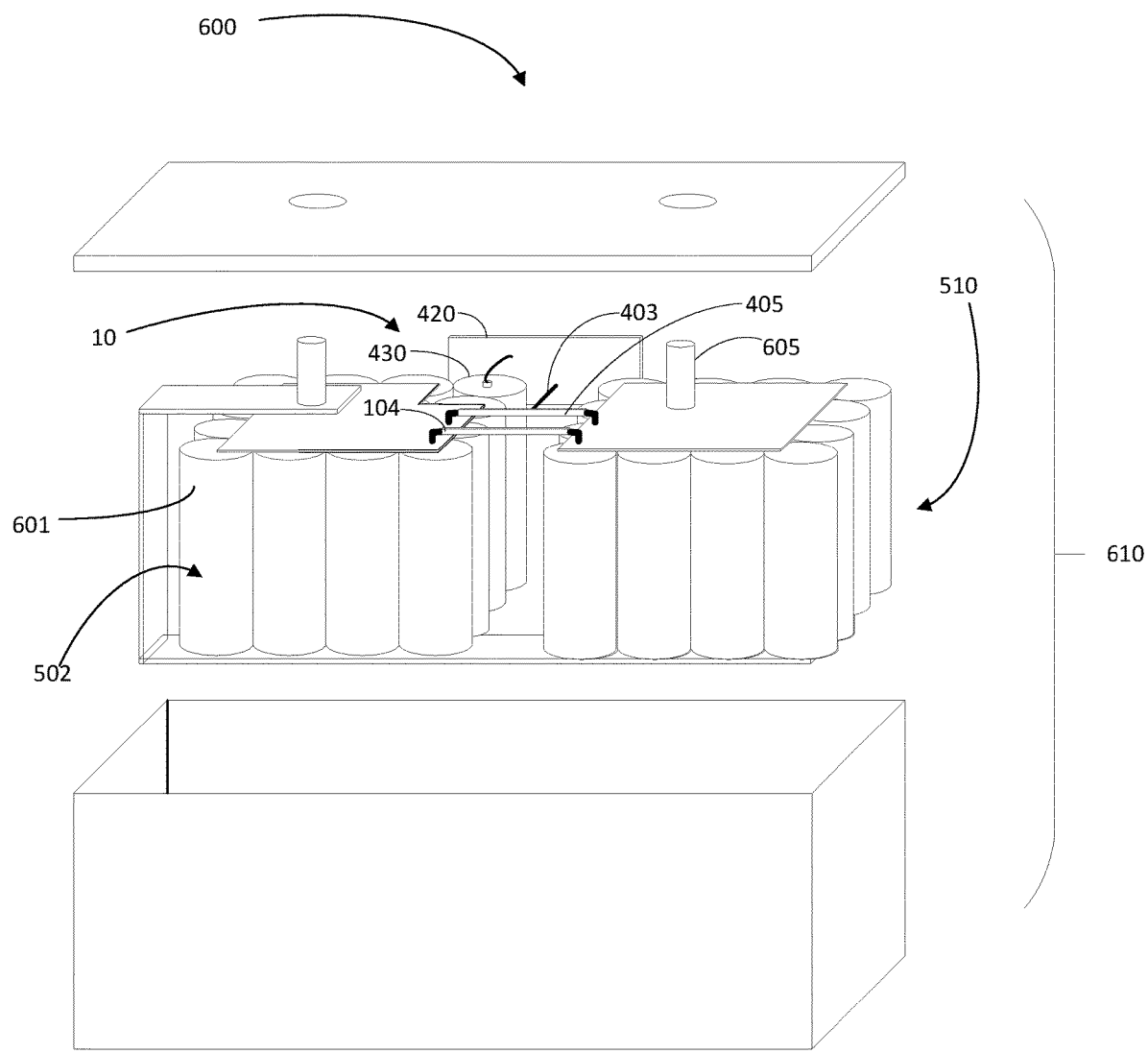
FIG. 6 illustrates a power pack system incorporating a power system, according to one embodiment.

As illustrated in FIG. 6, according to some embodiments, the battery 502, supercapacitor 510 and power system 10 are integrated into a hybrid power pack system 600. Battery cell(s) 601 that form the battery 502 are stored within a first portion of the housing 610 (e.g., a first side of an interior cavity of the housing 610) and capacitive component(s) 603 that form the supercapacitor 510 are stored within a second portion of the housing 610 (e.g. a second side on an interior cavity of the housing 610). The electrical components of the power system 10 are integrated into any variety of structures or configurations, and are supported relative to the power pack housing 610 such that the battery charge path 103 couples the battery cell(s) 601 to a positive terminal 605 supported by the housing 610, and so that the capacitor charge path 105 couples the capacitive component(s) 603 to the positive terminal 605. One or more of the battery cell(s) 601 supported within the housing 610 are optionally used to power the switch circuit 420. Alternatively, a secondary source 430 for powering the bypass system 400 is also supported by the power pack housing 610.

In such embodiments, the hybrid power pack system 600 may be directly coupled to a load (e.g., a high voltage load 512), without the need for the connection or wiring of any additional components thereto. In some such embodiments, the power pack system 600 also optionally includes additional components (e.g., a contactor, a fuse, etc.) that are also supported within the power pack housing 610.

As used herein, the terms "about" and "approximately" will be understood by persons of ordinary skill in the art and will vary to some extent depending upon the context in which they is used. If there are uses of these terms which are not clear to persons of ordinary skill in the art, given the context in which it is used, "about" and "approximately" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

Other embodiments are set forth in the following claims.

What is claimed is:

1. A power system for a vehicle, the power system comprising:
   a battery charge path and a capacitor charge path arranged in parallel to each other, the battery charge path being configured to provide current from a battery to a load and the capacitor charge path being configured to provide current from a capacitor to the load;
   a first thermistor arranged in series along the battery charge path and having a resistance that decreases with an increase in a first temperature to a first threshold temperature range; and
   a bypass system comprising:
      a bypass path arranged in parallel to the battery charge path;
      a switch element arranged along the bypass path, the switch element comprising a gate configured to effectuate a transition of the switch element to selectively prevent current flow and permit current flow along the bypass path; and
      a switch circuit comprising:
         a second thermistor having a resistance that increases responsive to an increase in a second temperature to a second threshold temperature range; and
         a resistor arranged into a voltage divider configuration, wherein the voltage divider configuration is configured to vary voltage supplied to the gate of the switch element responsive to the change in resistance of the second thermistor based on the increase in the second temperature;
   wherein, responsive to the second temperature being below the second threshold temperature range, the switch circuit is configured to prevent current flow along the bypass path at the same time the first thermistor is defined by a high resistance that substantially restricts current flow between the battery and load; and
   wherein, responsive to the second temperature exceeding the second threshold temperature range, the switch circuit is configured to allow current flow along the bypass path at the same time the first thermistor is defined by a low resistance that allows current to flow between the battery and load.

2. The power system of claim 1, wherein, when the first thermistor is defined by a resistance that substantially restricts current flow between the battery and the load, current flow between the battery and load is less than current flow along the capacitor charge path.

3. The power system of claim 1, wherein when the switch circuit operates to allow current flow along the bypass path, there is substantially no current flow along the capacitor charge path between the capacitor and the load.

4. The power system of claim 1, wherein the change increase in resistance of the second thermistor is effectuated without the application of an external control input signal.

5. The power system of claim 1, wherein the second temperature comprises a core temperature of the second thermistor, and the first temperature comprises a core temperature of the first thermistor.

6. The power system of claim 1, wherein the switch element comprises a semiconductor switch.

7. The power system of claim 1, wherein a resistance of the first thermistor decreases exponentially responsive to the first temperature reaching a temperature that exceeds the first threshold temperature range.

8. The power system of claim 7, wherein the second threshold temperature range corresponds to temperatures that are greater than the temperatures of the first threshold temperature range.

9. The power system of claim 1, wherein the switch circuit further comprises a power source that is arranged in series with the second thermistor.

10. The power system of claim 1, wherein the second thermistor is directly physically coupled to the battery charge path.

11. A power pack assembly, the power pack assembly comprising:
   a housing having a first portion configured to store a battery, and a second portion configured to store a capacitor; and
   a power system supported by the housing, the power system comprising:
      a battery charge path that extends between the first portion of the housing and a terminal supported by the housing;
      a capacitor charge path arranged in parallel to the battery charge path, the capacitor charge path extending between the second portion of the housing and the terminal;
      a first thermistor arranged in series along the battery charge path and having a resistance that decreases with an increase in a first temperature to a first threshold temperature range; and
      a bypass system comprising:
         a bypass path arranged in parallel to the battery charge path;

a switch element arranged along the bypass path, the switch element comprising a gate configured to effectuate a transition of the switch element to selectively restrict current flow and permit current flow along the bypass path; and a switch circuit configured to operate the switch element to restrict current flow along the bypass path, the switch circuit comprising:

a second thermistor having a resistance that increases responsive to an increase in a second temperature to a second threshold temperature range; and a resistor arranged into a voltage divider configuration, wherein the voltage divider configuration is configured to vary voltage supplied to the gate of the switch element responsive to the change in resistance of the second thermistor based on the increase in the second temperature;

wherein, responsive to the second temperature being below the second threshold temperature range, the switch circuit is configured to prevent current flow along the bypass path at the same time the first thermistor is defined by a high resistance that substantially restricts current flow between the battery and a load; and wherein, responsive to the second temperature exceeding the second threshold temperature range, the switch circuit is configured to allow current flow along the bypass path at the same time the first thermistor is defined by a low resistance that allows current to flow between the battery and the load.

12. The power pack assembly of claim 11, further comprising:

the battery; and the capacitor;

wherein the battery is contained within the first portion of the housing, and is connected to the terminal by the battery charge path; and wherein the capacitor is contained within the second portion of the housing, and is connected to the terminal by the capacitor charge path.

13. The power pack assembly of claim 11, wherein the increase in the second temperature comprises a change in a temperature of the core of the second thermistor.

14. A method for charging a load, comprising:

causing current from a battery to flow through a first thermistor located along a battery charge path, the battery charge path coupling the battery to a load;

causing current to flow from a capacitor to the load, wherein the capacitor is located in parallel to the first thermistor; and operating a switch circuit to cause a switch element to allow current to flow between the battery and the load along a bypass path that is arranged in parallel to the battery charge path, wherein operating the switch circuit comprises varying, by a resistor arranged into a voltage divider configuration, a voltage supplied to a gate of the switch element responsive to a change in resistance of a second thermistor of the switch circuit;

wherein the change in resistance of the second thermistor is responsive to an increase in temperature of the second thermistor; and wherein, responsive to the temperature being below a threshold temperature range, the switch circuit is configured to prevent current flow along the bypass path at the same time the first thermistor is defined by a high resistance that substantially restricts current flow between the battery and load; and wherein, responsive to the temperature exceeding the threshold temperature range, the switch circuit operates the switch element to allow current flow between the battery and the load along the bypass path at the same time that current from the battery is caused to flow to the battery along the battery charge path.

15. The method of claim 14, wherein:

the change in the resistance of the second thermistor occurs responsive to a temperature of the core of the second thermistor reaching the threshold temperature range; and wherein the core of the second thermistor reaches the threshold temperature range after current flow from the capacitor to the load has ceased.

* * * * *